(12) United States Patent
McDevitt et al.

(10) Patent No.: US 6,266,678 B1
(45) Date of Patent: Jul. 24, 2001

(54) SYSTEM AND METHOD FOR DYNAMICALLY VIEWING CONTENTS OF A DATA FILE

(75) Inventors: Christopher J. McDevitt, Souderton, PA (US); Kenneth D. Matson, Bellevue, WA (US)

(73) Assignee: Computer Associates Think, Inc., Islandia, NY (US)

( * ) Notice: Subject to any disclaimer, the term of this patent is extended or adjusted under 35 U.S.C. 154(b) by 0 days.

(21) Appl. No.: 09/224,622

(22) Filed: Dec. 31, 1998

(51) Int. Cl.[7] .................................................. G06F 15/173
(52) U.S. Cl. .......................... 707/201; 707/10; 709/203; 709/219; 709/224
(58) Field of Search ............................ 707/4, 9, 10, 102, 707/201; 709/203, 216, 219, 224

(56) References Cited

U.S. PATENT DOCUMENTS

| | | | |
|---|---|---|---|
| 5,261,069 | * 11/1993 | Wilkinson et al. | 711/145 |
| 5,452,448 | * 9/1995 | Sakuraba et al. | 707/201 |
| 5,706,435 | * 1/1998 | Barbara et al. | 711/141 |
| 5,724,648 | * 3/1998 | Shaughnessy et al. | 455/519 |
| 5,764,913 | * 6/1998 | Jancke et al. | 709/224 |
| 5,787,452 | * 7/1998 | McKenna | 707/536 |
| 5,829,001 | * 10/1998 | Li et al. | 707/10 |
| 5,926,636 | * 7/1999 | Lam et al. | 395/683 |
| 5,946,686 | * 8/1999 | Schmuck et al. | 707/10 |
| 5,978,828 | * 11/1999 | Greer et al. | 709/2.24 |
| 6,003,087 | * 12/1999 | Housel, III et al. | 709/229 |
| 6,009,422 | * 12/1999 | Ciccarelli | 707/4 |
| 6,128,601 | * 10/2000 | Van Horne et al. | 705/34 |

* cited by examiner

*Primary Examiner*—Jean R. Homere
(74) *Attorney, Agent, or Firm*—Baker & McKenzie (57) ABSTRACT

A system for viewing updates to a data file as they occur over time is provided. The system includes a file access client, such as a software package operating on a general purpose computer, that requests dynamic access to the data file. The system also includes a file access server, such as a software package operating on a general purpose computer. The file access server is connected to the file access client, such as through a network, and transmits the initial contents of the data file to the file access client and any data file modifications that occur over time.

37 Claims, 2 Drawing Sheets

SYSTEM AND METHOD FOR DYNAMICALLY VIEWING CONTENTS OF A DATA FILE

FIELD OF THE INVENTION

The present invention relates generally to a dynamic file access system that operates in a client-server environment, and more particularly to a dynamic file access system for a multiple computing platform environment that allows file updates to be dynamically viewed.

BACKGROUND

It is often necessary to access computer files that have been stored on a disk drive or memory device of a network server or other remote computer from a user's computer or terminal. The user's computer or terminal may be connected to the network server or other remote computer by a communications medium or media and communications hardware, such as telephone lines and modems, a local area network and network interface cards, the Internet, or other suitable communications media.

Even though the user's computer is connected in this manner to the network server or other remote computer, it is often difficult to allow more than one user to access a data file at any given time. When a first user is accessing the data file and performing updates to the data file, it is necessary to lock out other users from accessing the data file, so as to prevent multiple concurrent updates from being performed. In particular, the operating system controlling updates to the data file may not be configured to allow other operating systems of other computing platforms to access the data file, so as to prevent corruption of the data file.

Despite the risk of corrupting the data in a data file that may result if multiple users require access to the file, it may still be desirable to allow certain users to view the contents of a data file as it is being updated. For example, the UNIX operating system provides a "tail-f" command that allows a data file to be viewed after it has been saved to a disk drive or other memory device. The "tail-f" command only works, however, for files that are being controlled by a resident version of UNIX. In a multiple computer environment, such as a client-server environment, the UNIX "tail-f" command cannot be used to view the contents of data files.

SUMMARY OF THE INVENTION

Therefore, a need has arisen for a file access system and method that reduce or eliminate the problems associated with known systems and methods for providing multiple user access to data files.

In accordance with the present invention, a file access system and method are provided that substantially reduce or eliminate disadvantages and problems associated with previously developed systems and methods for providing multiple user access to data files.

It is an object of the present invention to provide a file access system that allows a user to dynamically view updates to a data file even when that user is using a computing platform that is subject to a different operating system than the operating system having control of updates to the data file.

It is another object of the present invention to provide a file access system that allows additional functions to be performed on a data file other than dynamic viewing of updates, such as data string searches.

It is another object of the invention to provide a method for providing dynamic access to data file updates that may be incorporated into multiple applications, so as to allow data files used by the servers for those applications to be dynamically viewed by a user from any node of the system.

In accordance with the present invention, a system for viewing updates to a data file as they occur over time is provided. The system includes a file access client, such as a software package operating on a general-purpose computer, that requests dynamic access to the data file. The system also includes a file access server, such as a software package operating on a general-purpose computer. The file access server is connected to the file access client, such as through a network, and transmits the initial contents of the data file to the file access client and any data file modifications that occur over time.

Yet another aspect of the present invention is a method for viewing updates to a data file as they occur over time. The method includes transmitting a request for file access from a file access client, such as a computer with a software system, to a file access server, such as another computer with a different software system. The file contents of the data file at the time the request was made are then transferred from the file access server to the file access client. File updates are transferred from the file access server to the file access client as they occur over time.

Yet another aspect of the present invention is a method for dynamically viewing updates to a data file. The method includes receiving a message at a file status server, such as a computer software program operating on a general-purpose computing platform. The data file name is extracted from the message, and a call back service is started for the data file. A predetermined function is then performed on the data file to determine if there has been a change in the data file. The results from performing the function, if any, are transmitted to the user.

The present invention provides many important technical advantages. One important technical advantage of the present invention is a system for providing dynamic access to a data file of a computing platform that allows the contents of the data file to be viewed dynamically from another computing platform without creating a risk of data corruption.

Another important technical advantage of the present invention is a method for providing dynamic access to a data file of a computing platform that allows a user to view changes to that data file from other nodes of a network, so as to allow debugging, maintenance, or other suitable functions to be performed even though the user is not physically present at the computing platform that has control of the data file.

BRIEF DESCRIPTION OF THE DRAWINGS

For a more complete understanding of the present invention and the advantages thereof, reference is now made to the following description taken in conjunction with the accompanying drawings, wherein like reference numerals represent like parts, in which.

DETAILED DESCRIPTION OF THE DRAWINGS

Set forth below is a detailed description of exemplary embodiments of the present invention.

Figure 1:
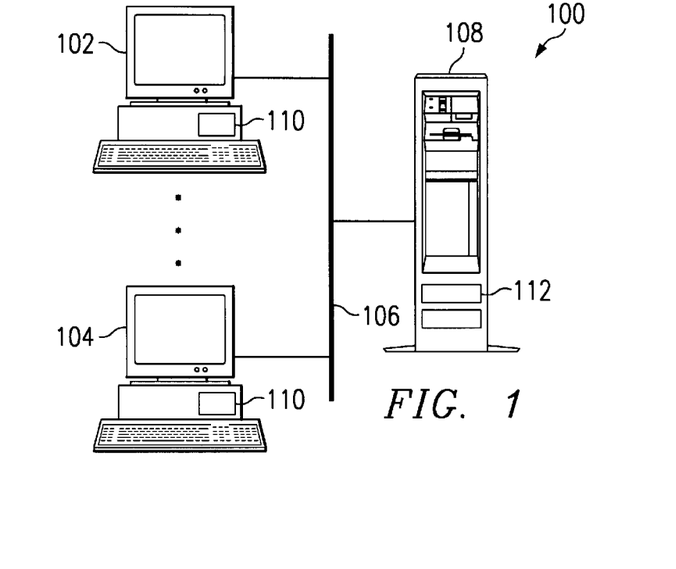
FIG. 1 is a diagram of a computer network embodying concepts of the present invention.

FIG. 1 is a diagram of a computer network 100 embodying concepts of the present invention. Computer network 100 may be used to allow a user to dynamically view updates to data files on a first node of computer network 100 from any of the other nodes of computer network 100. In this manner, a user may view the changes that are occurring in the data file without requiring access to the data file, and may also view the changes as they are being made on another node of the network. The user therefore does not need to be physically present at the node to view file updates, and may therefore perform network maintenance or trouble-shooting from any node of the network.

Computer network 100 includes two or more nodes 102 through 104. Each node 102 through 104 may include file viewing client 110. Nodes 102 through 104 are coupled to communications media 106, which is in turn coupled to server 108. In this application, coupling includes any mechanism or combination of mechanisms by which the two components may interact, such as network cards, modems, twisted pair conductors, coaxial conductors, fiber optic conductors, logical connections through logic circuits or data storage devices, or other suitable mechanisms. Server 108 includes file viewing server 112.

Nodes 102 through 104 are used to provide services to users of network 100. For example, nodes 102 through 104 may comprise personal computers having microprocessors, disk drives, random access memory, video co-processors, compact disk drives, and other suitable personal computing equipment. Likewise, nodes 102 through 104 may include remote terminals having sufficient microprocessor and memory components to remotely operate software applications stored on server 108. Nodes 102 through 104 may also comprise other suitable computing components.

File viewing client 110 is a system operating on one or more of nodes 102 through 104. File viewing client 110 may comprise software, hardware, or a suitable combination of hardware and software. File viewing client 110 preferably includes software that operates on general purpose computing platforms, and is resident on nodes 102 through 104. Alternatively, file viewing client 110 may be transferred from server 108 or another suitable server to nodes 102 through 104 after the user logs on to the server, such as server 108.

Communications media 106 is a data communications media that connects two or more nodes 102 through 104 to a server 108. For example, communications media 106 may be a 10baseT local area network communications media, a 100baseT local area network communications media, an Internet communications media, a fiber optic communications media, or other suitable communications media. Communications media 106 may operate on electrical, optical, electromagnetic, or other suitable physical principles. Communications media 106 is used to transfer encoded data communications, such as digitally encoded data, between nodes 102 through 104 and server 108.

Server 108 is a computing network service provider that includes file viewing server 112. For example, server 108 may comprise a microcomputer having one or more disk drives, random access memory, and other suitable computing hardware. Server 108 may also comprise a personal computer, a workstation, a laptop, or other suitable computing platforms that can operate file viewing server 112.

File viewing server 112 is a system that is operable to provide file viewing services to file viewing clients 110. File viewing server 112 may comprise software, hardware, or a suitable combination of hardware and software. File viewing server 112 is preferably a software application operating on server 108. File viewing server 112 may also or alternatively comprise a system or subsystem of a suitable software system operating on a general purpose computing platform, such as an operating system.

In operation, a user at node 102 through 104 requests access to a file stored on server 108, either by manually entering a request or by automatically entering a request, such as upon activation of a software system. Likewise, if server 108 includes a user interface, the client may be an operator that is accessing server 108 at server 108 rather than through communications media 106. In that situation, file viewing client 110 could also be resident on server 108, such that all communications between file viewing client 110 and file viewing server 112 occurs through the data structures and buses of the computing platform of server 108.

File viewing client 110 preferably prompts a user with an input screen that requests a data file name and any other information that may be required to locate the data file. For example, the user may be presented with a request to provide a file name, a server, a drive, an application directory, or other suitable information. If the user does not know certain of the information, the user may also be provided with pull-down menus, search screens, or other suitable aids for identifying the data file of interest to the user. File and server locations may also be automatically generated or cross-referenced according to the location of the user, the user identification data associated with the user, or other suitable processes.

After receiving the user input identifying the requested file, file viewing client 110 then transmits a request that includes the file name to file viewing server 112. Preferably, the file viewing server 112 that receives the request is resident on the server 108 that is storing the file. However, file viewing server 112 may also alternatively control data storage devices on other servers 108 or nodes of computer network 100. File viewing server 112 then assembles an initial transmission comprising the current contents of the requested data file and transmits the current contents of the data file to the user. The file viewing client 110 operating on the user's node then presents the data file contents to the user in a user-readable format.

According to an embodiment of the present invention, file viewing server 112 presents the initial contents of the data file to file viewing client 110 in a predetermined manner. For example, file viewing server 112 may periodically check for changes in the data file, such as by comparing data file size and access time records with data file size and access time records from the last time the data file was monitored. For example, file viewing server 112 may store the access time and file size at the time the initial contents of the data file are transmitted to the user, and may then compare the access time and file size after a predetermined time period, such as two seconds, to these stored values. If there is a change in the access time or file size data fields, these new data field values are then stored for comparison at future times.

Other suitable processes may be likewise be used to determine if a change in the files has occurred. For example, file viewing server 112 may control data storage to the data file, such that any modifications to the data file are buffered for transmission to the file viewing client 110. Alternatively, file viewing server 112 may perform other functions such as text string searches, may compare the current contents of the data file with a buffered version of the data file, or may perform other suitable data file functions.

The updates to the data file that are detected by file viewing server 112 are transmitted to file viewing client 110 until a pre-determined time. For example, the data file updates may be transmitted until file viewing client 110 transmits a command to file viewing server 112 instructing file viewing server 112 to cease transmission of data file updates. Alternatively, file viewing server 112 may verify whether updates to the data file are occurring, such as whether the data file has been opened by another user or another application. If such data file updates are not occurring, file viewing server 112 may transmit a suitable message to file viewing client 110 instructing file viewing client 110 that the file is dormant and that no further updates are being made. Other suitable features may be implemented to cease the transmission of data file updates.

In this manner, file viewing client 110 may receive the current contents of the data file dynamically, as those contents change over time. These data file updates may be received from any file viewing server 112 that is coupled over communications media 106 to a file viewing client 110 operating on node 102 through 104, or on server 108 as previously described. Thus, file viewing client 110 and file viewing server 112 allow a network administrator to monitor services by looking at log files on servers, such as file servers, mail servers, communications servers, or other suitable servers, to see how they are responding as users of the network log on and use the services provided by those servers over time. Likewise, maintenance and debugging operations may also be performed for a node or server location without requiring the network maintenance personnel to physically travel to the node where the log file is stored.

As previously described, the present invention may be implemented in a suitable structure other than a client-server structure. For example, the functionality of file viewing client 110 and file viewing server 112 may be incorporated into a general purpose program, such as an operating system, a word processing system, a communications system, a mail system or other suitable systems, such that the only access provided is to certain predetermined log files. Also or alternatively, the present invention may be provided with security restrictions, such that certain classes of users are allowed to only view files associated with their class.

Figure 2:
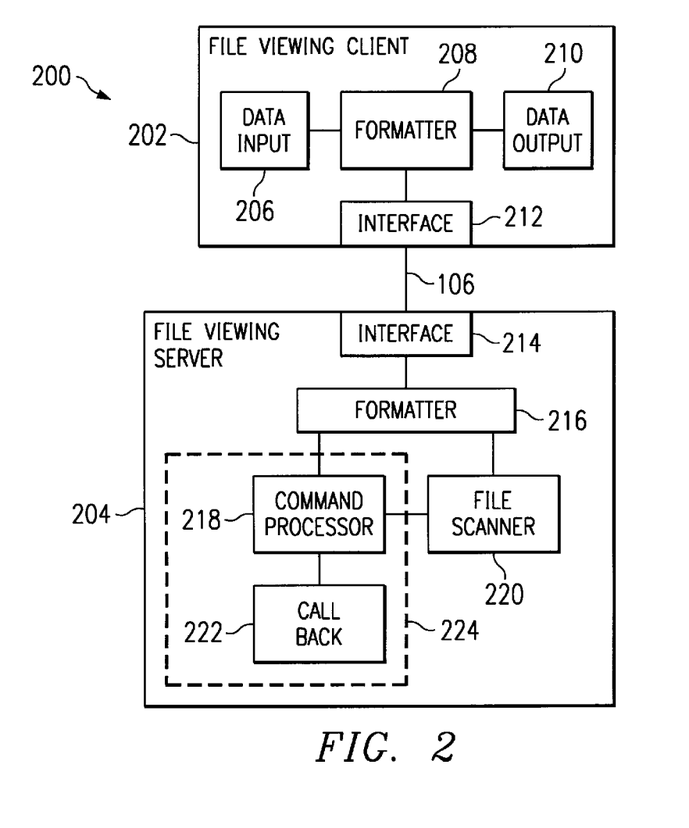
FIG. 2 is a block diagram of a file access client and a file access server embodying concepts of the present invention.

FIG. 2 is a block diagram of a file viewing client 202 and a file viewing server 204 embodying concepts of the present invention. File viewing client 202 may be used in applications similar to file viewing client 110, and file viewing server 204 may be used in applications similar to file viewing server 112 of FIG. 1.

File viewing client 202 may comprise hardware, software, or a suitable combination of hardware and software. File viewing client 202 preferably comprises a software application system operating on a general-purpose computing platform. File viewing client 202 includes data input system 206, which is coupled to formatter system 208. Data output system 210 is also coupled to formatter system 208. Formatter system 208 is coupled to interface system 212, which is in turn coupled to communication media 106.

File viewing server 204 also includes an interface system 214 coupled to communications media 106. Formatter system 216 is coupled to interface system 214, command processor system 218, and file scanner system 220. Call back system 222 is coupled to command processor system 218. Call back system 222 and command processor system may also or alternatively comprise a command library 224 of commands or functions, or a single command processing system 224.

File viewing client 202 is preferably a user-initiated system that allows the contents of a file to be dynamically viewed, but may be automatically invoked upon the occurrence of predetermined conditions. File viewing client 202 resides on a client or server node, such as a personal computer, a remote terminal, an access terminal for a server, or other suitable systems or devices. File viewing client 202 allows the contents of a file to be viewed as they change over time, such as to allow a network administrator to monitor server log files to see how the contents of the log files change as users access the server. In addition, debugging and maintenance activities may be performed by network administrators using file viewing client 202 without requiring the network administrators to be physically present at the service terminal for the server.

In operation, a user operates the file viewing client 202 by initiating data input system 206 operation, such as by selecting an icon in a windows operating environment. Data input system 206 prompts the user for the file identification information that is required to access the data file. For example, data input system 206 may request a file name from the user, a node location for the server, or other suitable data. Alternatively, such data may be automatically generated depending upon the user, the node from which file viewing client 202 is activated, or other suitable data.

Data input system 206 is coupled to formatter system 208 and passes the file identification data entered by the user to formatter system 208. This file identification data is typically in a pre-determined data structure that is used by other systems of file viewing client 202 or the computing platform on which file viewing client 202 operates. The file identification data may also or alternatively be provided in an optimized data structure for use by file viewing client 202. Formatter system 208 receives the data from data input system 206 and converts the data into a generic message data format, such as a canonical message format for use over a local area network or other data communications media. Formatter system 208 then transfers the message to interface system 212, which transfers the message over communications media 106 to the file viewing server 204.

Interface 212 may be an application program interface used by a distributed client-server system. Alternatively or in addition, interface system 212 may comprise a network hardware card system, a modem, or other hardware interfaces to communications media 106. Preferably, interface system 212 is a distributed system that is operable to receive data messages transparent of the hardware network interface devices or modulator-demodulator devices and communications media, and to transfer those messages to addressed destinations within the network. Such destinations may also include destinations that are reached through a local area network portal to a wide area network, the Internet, or other suitable locations reached through communications media.

Formatter system 208 is also operable to receive messages from interface system 212 and to convert those data messages into a data format suitable for use by data output system 210. Data output system 210 is used to present data in a user-readable format from the file viewing server 204. For example, this data may be a message stating that the file does not exist. The data may also comprise the initial contents of the data file requested by the user, updates to the data file requested by the user as those updates occur to that file, or other suitable data.

File viewing server 204 may be implemented in software, hardware or a suitable combination of hardware and software, and is preferably a software application operating on a general purpose computing platform. File viewing server 204 receives automatically-generated or user-entered file information, locates the requested file for the user, and transmits the initial data contents of the data file and updates as they occur. File viewing server 204 includes interface system 214, which is coupled to communications media 106. interface system 214 is preferably an applications program interface that is operable to transfer data messages between locations on a network, in a manner that is transparent of the underlying hardware and software communication devices of those locations. Interface system 214 may also include network access cards, modulator-demodulator devices, or other suitable hardware and operating software for that hardware.

Interface system 214 is coupled to formatter system 216. Formatter system 216 is operable to receive data messages from interface system 214 and to convert the data messages into a format that is usable by command processor system 218, file scanner system 220, and call back system 222. This data format may be a data format that is used by the operating system of the computing platform on which file viewing server 204 operates, or may be an optimized data format for use by the subsystems of file viewing server 204.

Command processor system 218 receives data messages from formatter system 216, and determines whether these data messages contain operating commands for use by file viewing server 204. For example, command processor system 218 may determine that the data message contains a command containing a request for dynamic access to a data file, and may subsequently determine whether that data file may be accessed by file viewing server 204. Command processor system 218 then instructs file scanner system 220 to initiate dynamic access to the data file, and call back system 222 to initiate callback of dynamic file updates to the user or file viewing client 202 requesting such services. Alternatively, if command processor system 218 determines that the requested file cannot be accessed on the server on which file viewing server 204 operates, command processor system 218 may generate an error message for transmission to the user, or may attempt to identify the correct server and generate a confirmation request for the user to confirm that the correct server has been chosen.

File scanner system 220 is coupled to command processor system 218 and formatter system 216, and is operable to open a data file and to access updates to the data files as the updates occur. For example, file scanner system 220 may operate similar to the UNIX "tail-f" command, such that the contents of the data file that have been stored to a disk or other data memory device may be extracted and transmitted to the user without altering those contents in a manner that would create an unstable situation for the data in the file. Unlike the UNIX "tail-f" command, though, file scanner system 220 may operate on a local area network having two or more computing nodes. File scanner system 220 tracks updates that have occurred to the data file by a suitable method, such as by storing file status characteristics in data fields and periodically checking those file status characteristics for changes.

For example, the file size and access time data may be checked every two seconds and compared with the stored values of the file size and access time data fields. If any changes have occurred, then file scanner system 220 stores the new values of file size and access time in the corresponding data fields, and performs a predetermined function on the data file. For example, the predetermined function may comprise file scanner system 220 locating a pointer field that identifies the data address of the last data field that was previously stored in the data file. Any data having a data address that occurs after the data address of the pointer, or having an address greater than the address of this pointer, may be data that has been added to the file since the last time the file was scanned.

Alternatively, the data file may be structured such that the file may be updated by direct modification of the data structure within the file. In this case, the previously stored address of the last data record in the file will not provide indication of the data records that have changed. Other functions may therefore be performed or may need to be performed to determine if there have been any changes, or to identify the data that has changed. For example, the contents of the data file may be stored in a buffer, and the buffered file may be compared to the current data file if there have been changes to the file access time or data file size fields. Alternatively, a data string search may be performed that identifies predetermined data that would signify that the data file has been modified, or that data of interest has been added to the data file, such as an error message. In general, file scanner system 220 may perform any suitable data file function on the data file and return the results, if any, to the user for user evaluation.

Call back system 222 is coupled to command processor system 218, and may be a subsystem of command processor system 218, a related library function, or other suitable systems. Call back system 222 periodically causes file scanner system 220 to perform the predetermined function on the data and to transmit the data to formatter system 216. For example, the initial response received from file scanner system 220 may be the initial data contents of the data file. Call back system 222 causes file scanner system 220 to transfer these data contents to formatter system 216 in a predetermined format, such as the format of the operating system of the computing platform on which file viewing server 204 operates or in an optimized data format used by file viewing server 204. Call back system 222 also causes file scanner system 220 to transmit file updates as they occur dynamically. Multiple users may request such access to a single data file, and a single user may also request access to multiple data files.

In operation, a user accesses file viewing client 202 through data input system 206. Data input system 206 may prompt the user using a text prompt, a display window, or other suitable prompt. Data input system 206 may also or alternatively be a command library 224 that is automatically activated when the user formats an appropriate command structure, typified by a command header and suitable command data structures, such as file name, server location, or other suitable command data. File viewing client 202 then interfaces with file viewing server 204 to provide the user with the initial contents of the data file, followed by updates to the data file as they occur.

In the embodiment shown in FIG. 2, the request for dynamic file status access is transferred from formatter system 208 to interface systems 212 and 214 back through formatter system 216 of file viewing server 204 and to command processor system 218. Command processor system 218 transfers commands to file scanner system 220 for the requested file, and file scanner system 220 initiates dynamic status coverage of that file. Call back system 222 generates periodic commands to cause the transfer of data back to the user through formatter system 216, interface systems 214 and 212, formatter system 208, and data output system 210.

Termination of dynamic access to the data file may be handled in a suitable manner. Preferably, the user enters a command through data input system 206 to terminate access to the file. This command is received by command processor system 218, which verifies the correct structure of the command and generates additional commands for file scanner system 220 to cause the access to the data file to be terminated. Alternatively, other suitable methods may be used to terminate access to the file, such as by scanning user access to the data file to determine when no further user access is occurring. In this alternative embodiment, a message may be generated by file scanner system 220 or command processor system 218 that notifies the user that the file has been closed and is not currently undergoing modifications. Likewise, command processor system 218 may receive commands from other users or servers that will cause dynamic access to the file to be suspended, such as lock out commands, maintenance commands, administrative commands, or other suitable commands.

File scanner system 220 may also be configured to provide dynamic access to the file for a predetermined period of time after which file scanner system 220 terminates dynamic access unless subsequently instructed by the user to reinitiate dynamic access. File scanner system 220 may also be used to regulate access to the data file, such that any modifications stored to disk for the data file must be routed through file scanner system 220, thereby allowing file scanner system 220 to monitor the status of updates to the data file. One of ordinary skill in art will recognize that other suitable methods may be used to provide dynamic access to the data file.

Figure 3:
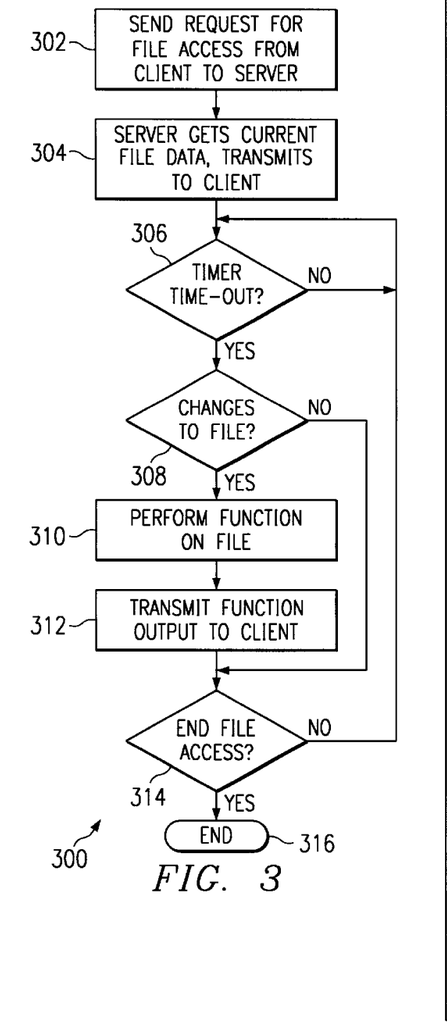
FIG. 3 is a flowchart of a method for providing dynamic access to a data file in accordance with teachings of the present invention.

FIG. 3 is a flowchart of a method 300 for providing dynamic access to a data file in accordance with teachings of the present invention. Method 300 may be implemented by a file access client-server system, such as that shown in FIG. 2, or by other suitable systems.

Method 300 begins at step 302 where a request for file access is sent from a client to a server. In this regard, the client and the server may be resident applications operating on different computing platforms, but might not be distinctly identified as clients and servers. For example, the request may be sent from a first operating system and received by a second operating system, where each operating system includes client functionality and server functionality.

The method then proceeds to step 304 where the server gets the current file data and transmits the current file data to the client. For example, the server may first verify that the data file is either present on the computing platform of the server or that the server has control over the data file, such as at a remote or local data storage device. The server may then verify whether the client has permission to access the data file, whether the data file has been changed or has been superceded by a more recent version, or other suitable functions. If the server determines that transmission of the data file should not occur, additional steps may be provided to notify the user of the reason for failure of dynamic access. If the server determines that transmission of the data file to the user is authorized, then the contents of the data file may be copied to a buffer and transmitted in a suitable message format through the communications media connecting the server to the client. The method then proceeds to step 306.

At step 306, it is determined whether a timer timeout has occurred. If a timer timeout has occurred, then the method proceeds to step 308 where it is determined whether a change has occurred to the file. For example, when the server transmits the current data file information to the user at step 304, the size of the data file and access information for the data file may also be stored at that time in data fields.

These data fields may be compared at step 308 with the current size of the data file and access information to determine if changes have been made to the data file. If changes have been made to the data file the method proceeds to step 310, otherwise the method proceeds to step 314.

At step 310, one or more data file functions are performed on the data file by the server. For example, the server may retrieve a pointer data field from memory that identifies a memory address for the data file that previously held the last data field for the data file. All data occurring after that data field, such as data having a data address that is greater than the data address of the data field associated with the pointer, may then be retrieved by the server and transmitted to the user. Alternatively, the server may perform a compare between the current contents of the data file and the contents of the previous contents of the data file that have been stored to a buffer, perform a data string search on the file, or may perform other suitable data functions on the data file. The method then proceeds to step 312.

At step 312, the results from performing the function on the data file are transmitted to the client. For example, if the results of the function are all of the data fields in the data file having a data address occurring after a data field address of the pointer, then that information may be transmitted to the client. Likewise, other suitable data may be transmitted, such as a message notifying the user that a data string is now present in the data file if the results of the function are the occurrence of the data string. The method then proceeds to step 314.

If timer timeout has not occurred at step 306 or no changes to the file have occurred at step 308, the method proceeds directly to step 314. At step 314, it is determined whether file access should be terminated. Preferably, file access is terminated upon receipt of a command from the user instructing the server to terminate dynamic file access. Dynamic file access may also be terminated for other suitable reasons or upon receipt of other suitable commands. For example, if all users of the data file have logged out of the data file, then dynamic access to the data file may be terminated until such time as additional updates to the file may occur. Likewise, administrative commands may be generated to lock out access to the data file. Error messages may also be reviewed to determine whether access to the data file should be terminated. A timer may also be used to determine whether access to the data file should be terminated. If it is determined that step 314 that dynamic access to the data file should be terminated, then the method proceeds to step 316 and terminates. Otherwise, the method returns to step 306.

In operation, method 300 is used to provide dynamic file access to a user. Method 300 may be used in a client-server environment, by complementary applications or operating systems that include client-server functionality, or by other suitable systems. Method 300 allows a user to view the contents of a data file when that user is physically located at a location other than the server that controls access to the data file. The data file access provided by method 300 is dynamic, so as to allow a user to perform network maintenance, debugging, or other suitable operations.

Figure 4:
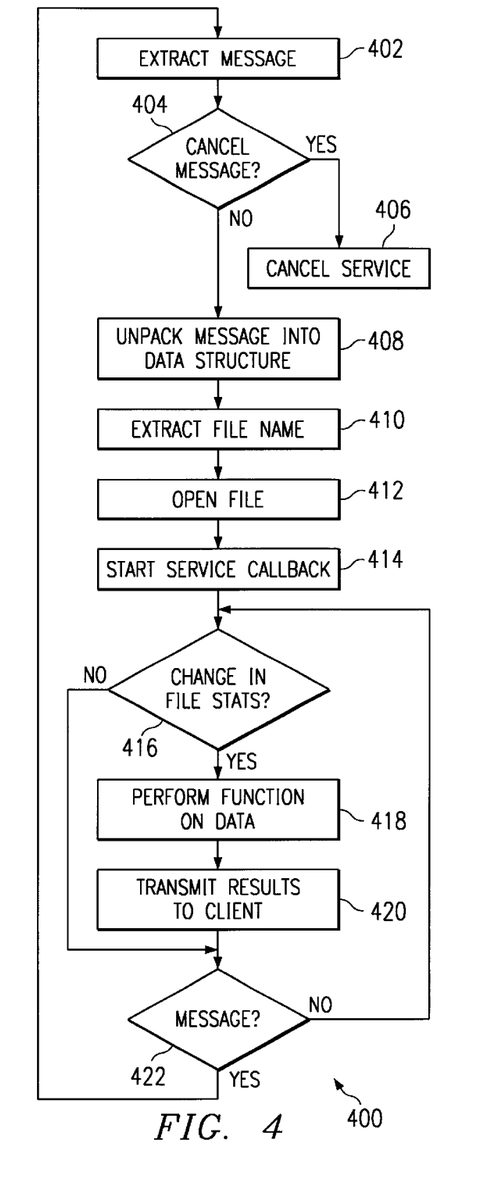
FIG. 4 is a flowchart of a method for providing dynamic access to a data file in accordance with teachings of the present invention.

FIG. 4 is a flowchart of a method 400 for providing dynamic access to a data file in accordance with teachings of the present invention. Method 400 may be used by an operating system, a server, or other suitable systems or devices to provide dynamic access to user locally or at a remote terminal or device.

Method 400 begins at step 402, where a message is extracted from a data structure. The method then proceeds to step 404, where it is determined whether the message is a cancel message. If the message is a cancel message then the method proceeds to step 406 and the file access service is cancelled. Otherwise, the method proceeds to step 408.

At step 408, the message is unpacked into a suitable data structure, such as one that may be used by the operating system or computing platform that is operating method 400. The method then proceeds to step 410, where the filename is extracted from the data structure. This filename may also be subsequently modified to include additional data that may be required to locate the data file location, such as data that is a function of the user that is requesting access to the data file, data that is a function of the server that received the message, or other suitable data.

At step 412, the data file is opened and the contents of the data file are retrieved and buffered for transmission to the user. In addition, other information may also be buffered at this time, such as the file size, access information, the data address of the last data field or data record in the data file, or other suitable data. The method then proceeds to step 414, where a call back service is initiated. The call back service typically tracks the user requesting access to the data file, and ensures that updates to the data file are transferred to the user. The initial status of the data file may also be transmitted to the user at step 414. The method then proceeds to step 416.

At step 416, it is determined whether a change in the file status has occurred. For example, a change in file size or in access parameters may be determined by comparing the present file size and access parameters to file size and access parameters stored at a previous time. Other suitable methods may also be used to determine whether a change in file status has occurred, such as by monitoring data stored to the file, by performing a data file function on the data file such as a compare or text string search, or by other suitable methods. If a change in file status has not occurred, the method proceeds to step 422. If a change in file status has occurred, then the method proceeds to step 418.

At step 418, a data file function is performed on the data file. For example, the data file function may comprise determining the data address of a pointer, and copying all data stored in the data file that occur after or have an address greater than the address of a pointer. Alternatively or in addition, other data file functions may be performed such as a compare function, a text string search, or other suitable functions. Follow-up functions may also be performed, such as resetting the data field address of the pointer, or other suitable functions. The method then proceeds to step 420.

At step 420, the results from performing the function on the data file are transmitted to the client. For example, if the results are all of the data occurring after the data address of the pointer, then this data may be buffered from the data file and converted to a message format suitable for transmission to the user on a client node or other operating systems. The method then proceeds to step 422.

At step 422, it is determined whether a message has been received, such as a message from the user, an error message, an administrative message, or other suitable messages. If a message has not been received, then the method returns to step 416. Otherwise, the method returns to step 402.

In operation, method 400 is used to provide dynamic access to a data file. Method 400 may be used in conjunction with a file access client and a file access server, or may be incorporated into applications such as mail applications, communications applications, word processing applications, or other suitable applications. Method 400 allows a user to access log files or other suitable data files as those files are updated, so that the user may perform administrative functions, operation functions, maintenance functions, debugging functions, or other suitable functions. Method 400 allows the user to access the data file from any node of a network, such as a local area network, a wide area network, the Internet, or other suitable networks, or through a remote communications link.

While this invention has been described with reference to illustrative embodiments, this description is not intended to be construed in a limiting sense. For example, the preferred embodiments disclosed herein may include various systems and sub-systems that are required only to provide enabling disclosure and the best mode of practicing the invention, but which are not intended to limit the invention as contained in the appended claims. Various modifications and combinations of the illustrative embodiments, as well as other embodiments of the invention, will be apparent to persons of ordinary skill in the art upon reference to the description. It is therefore intended that the appended claims encompass any such modifications or embodiments.

What is claimed is:

1. A system for dynamically viewing updates to a data file, comprising:
   a file access client operable to request dynamic access to a data file; and
   a file access server coupled to the file access client, the file access server operable to transmit an initial content of the data file to the file access client and to initiate tracking of modifications that occur over time in the data file, the file access server being operable to transmit the modifications, wherein the client is enabled to dynamically view the updates to the data file as they occur.

2. The system of claim 1 wherein the file access client further comprises a data input system operable to prompt a user for data file identification data and to place the data file identification data in a predetermined data structure.

3. The system of claim 2 wherein the file access client further comprises a formatter system coupled to the data input system, the formatter system operable to receive the data file identification data from the data input system in the predetermined data structure and to convert the data file identification data into a canonical message format.

4. The system of claim 3 wherein the file access client further comprises a data output system coupled to the formatter system, the formatter system further operable to receive data file status data in the canonical message format and to convert the data file status data into another predetermined data structure, the data output system operable to present the data file status data in a user-readable format.

5. The system of claim 1 wherein the file access client and the file access server each comprise an interface system operable to transfer data to and from a communications media.

6. The system of claim 5 wherein the interface system is an applications program interface.

7. The system of claim 1 wherein the file access server further comprises:
   a file scanner system operable to perform one or more functions on the data file; and
   a callback system coupled to the file scanner system, the callback system operable to compile data output by the file scanner system for transmission to the file access client.

8. The system of claim 7 wherein the file scanner system is operable to determine if a present value of a file access time field and a file size field is different from a previous value of the file access time field and the file size field, to output all data in the data file occurring after a pointer position of the data file, and to change the pointer position of the data file to correspond with the last data record in the data file.

9. The system of claim 7 wherein the file access server further comprises a command processor system coupled to the file scanner system, the command processor system operable to transfer one or more commands to the file scanner system to cause the file scanner system to initiate file scanning on the data file, the command processor system further operable to transfer one or more commands to the file scanner system to cause the file scanner system to cease file scanning on the data file.

10. The system of claim 7 wherein the function performed by the file scanner system is a data string search.

11. The system of claim 7 wherein the function performed by the file scanner system is a compare of the present contents of the data file with a buffered version of the data file.

12. The system of claim 9 wherein the file access server further comprises a formatter system coupled to the command processor system and the callback system, the formatter system operable to receive data file identification data in a canonical message format, to convert the canonical message format to a predetermined format, to transfer the data file identification data in the predetermined format to command processor system, to receive compiled data from the callback system, and to convert the compiled data into the canonical message format.

13. A method for dynamically viewing updates to a data file comprising:
   transmitting a request for file access from a file access client to a file access server;
   transmitting initial file contents from the file access server to the file access client;
   tracking updates that have occurred to the initial file contents; and
   transmitting the updates from the file access server to the file access client, wherein the client is enabled to dynamically view the updates to the data file as they occur.

14. The method of claim 13 wherein transmitting file updates from the file access server to the file access client further includes:
   determining whether changes have occurred to the data file after a predetermined amount of time has passed;
   performing a function on the data file to generate change data; and
   transmitting the change data from the file access server to the file access client.

15. The method of claim 14 wherein performing the function on the file to generate change data further includes:
   determining a data address of a pointer;
   copying the data occurring after the data address of the pointer to generate the change data; and
   setting the pointer location to equal the last data address in the data file.

16. The method of claim 14 wherein performing the function on the file to generate change data further includes:
   performing a data string search on the data file; and
   returning a predetermined value as the change data if the data string is found in the data file.

17. The method of claim 14 wherein performing the function on the file to generate change data further includes:
   performing a file compare with a current content of the data file and a buffered version of the data file; and
   returning the results of the file compare as the change data.

18. The method of claim 13 further comprising transmitting a command from the file access client to the file access server to terminate the transmission of file updates.

19. The method of claim 13 further comprising terminating the transmission of file updates if the file is not being accessed by another user.

20. A method for dynamically viewing updates to a data file comprising:
   receiving a message at a file status server;
   extracting a data file name from the message;
   periodically performing a function on the data file if there is a change in the data file; and
   transmitting the results of the function to a user,
   wherein the client is enabled to dynamically view the updates to the data file as they occur.

21. The method of claim 20 further comprising terminating the call back service for the data file if the message is a terminate service message.

22. The method of claim 20 wherein starting the call back service for the data file further includes:
   transmitting the initial contents of the data file to the user; and
   starting a timer cycle.

23. The method of claim 20 wherein performing a function on the data file if there is a change in the data file further includes:
   comparing a file size at the end of a current timer cycle to the file size at the end of a previous timer cycle;
   determining whether the time value stored in a file access time field is greater than a time value of the end of the previous timer cycle; and
   performing the function on the data file if the file size at the end of the current timer cycle is not equal to the file size at the end of the previous timer cycle and if the time value stored in the file access time field is greater than the time value at the end of the previous timer cycle.

24. The method of claim 20 wherein performing a function on the data file further includes:
   copying all data in the file with an address after a pointer address; and
   resetting the pointer address to equal the address of the last data record in the data file.

25. The method for dynamically viewing updates to a data file as claimed in claim 13, wherein the transmitting the updates includes dynamically transmitting the updates from the file access server to the file access client when it is detected that updates have occurred.

26. The method for dynamically viewing updates to a data file as claimed in claim 13, wherein the transmitting the updates includes periodically transmitting the updates from the file access server to the file access client.

27. A system for dynamically viewing updates to a data file, comprising:
   a file access client operable to request dynamic access to a data file;
   a file access server coupled to the file access client, the file access server operable to transmit an initial content of the data file to the file access client and data file modifications dynamically occurring over time;

a file scanner system operable to perform one or more functions on the data file;

a callback system coupled to the file scanner system, the callback system operable to compile data output by the file scanner system for transmission to the file access client;

a command processor system coupled to the file scanner system, the command processor system operable to transfer one or more commands to the file scanner system to cause the file scanner system to initiate file scanning on the data file, the command processor system further operable to transfer one or more commands to the file scanner system to cause the file scanner system to cease file scanning on the data file, a formatter system coupled to the command processor system and the callback system, the formatter system operable to receive data file identification data in a message format, to convert the message format to a predetermined format, to transfer the data file identification data in the predetermined format to command processor system, to receive the compiled data from the callback system, and to convert the compiled data into the message format.

28. The system for dynamically viewing updates to a data file as claimed in claim 27, wherein the message format includes a canonical message format.

29. A program storage device readable by machine, tangibly embodying a program of instructions executable by the machine to perform method steps of dynamically viewing updates to a data file, comprising:

transmitting a request for file access from a file access client to a file access server;

transmitting initial file contents from the file access server to the file access client;

tracking updates that have occurred to the initial file contents; and transmitting the updates from the file access server to the file access clients, wherein the client is enabled to dynamically view the updates to the data file as they occur.

30. The program storage device as claimed in claimed 29, wherein the method step of transmitting the updates includes dynamically transmitting the updates as soon as the updates are detected.

31. A computer data signal embodied in a carrier wave and representing sequences of instructions which, when executed by a machine, cause the machine to perform the steps of:

transmitting a request for file access from a file access client to a file access server;

transmitting initial file contents from the file access server to the file access client;

tracking updates that have occurred to the initial file contents; and transmitting the updates from the file access server to the file access client, wherein the client is enabled to dynamically view the updates to the data file as they occur.

32. A system for dynamically viewing updates to a data file, comprising:

file access client means for requesting dynamic access to a data file; and file access server means for transmitting an initial content of the data file to the file access client means and initiating tracking of modifications that occur over time to the data file in response to receiving requests for dynamic access to the data file, the file access server means further transmitting the modifications to the file access client means, wherein the client is enabled to dynamically view the updates to the data file as they occur.

33. The system for dynamically viewing updates to a data file as claimed in claim 32, wherein the file access server means transmits the modifications as the modifications occur.

34. The system for dynamically viewing updates to a data file as claimed in claim 32, wherein the file access server means transmits the modifications as soon as the modifications are detected.

35. The system for dynamically viewing updates to a data file as claimed in claim 32, wherein the file access server means transmits the modifications every predetermined period.

36. The system for dynamically viewing updates to a data file as claimed in claim 1, wherein the file access server transmits the modifications as soon as the modifications are detected.

37. The system for dynamically viewing updates to a data file as claimed in claim 1, wherein the file access server transmits the modifications every predetermined period.

* * * * *